(12) United States Patent
Whitehead

(10) Patent No.: US 9,897,890 B2
(45) Date of Patent: Feb. 20, 2018

(54) REFLECTIVE IMAGE DISPLAY WITH THRESHOLD

(71) Applicant: CLEARink Displays LLC, Santa Clara, CA (US)

(72) Inventor: Lorne A. Whitehead, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 130 days.

(21) Appl. No.: 14/874,565

(22) Filed: Oct. 5, 2015

(65) Prior Publication Data

US 2016/0097961 A1 Apr. 7, 2016

Related U.S. Application Data

(60) Provisional application No. 62/060,652, filed on Oct. 7, 2014.

(51) Int. Cl.
*G02B 26/00* (2006.01)
*G02F 1/167* (2006.01)

(52) U.S. Cl.
CPC ........ *G02F 1/167* (2013.01); *G02F 2203/026* (2013.01)

(58) Field of Classification Search
CPC ............... G02F 1/167; G02F 2203/026; G02F 2001/1676
See application file for complete search history.

(56) References Cited

U.S. PATENT DOCUMENTS

| | | | |
|---|---|---|---|
| 3,792,308 A | 2/1974 | Ota | |
| 3,919,031 A | 11/1975 | White | |
| 4,025,674 A | 5/1977 | Mizuochi | |
| 4,071,430 A | 1/1978 | Liebert | |
| 4,203,106 A | 5/1980 | Dalisa et al. | |
| 4,648,956 A | 3/1987 | Marshall et al. | |
| 4,821,092 A | 4/1989 | Noguchi | |
| 5,019,748 A | 5/1991 | Appelberg | |
| 5,319,491 A | 6/1994 | Selbrede | |
| 5,359,346 A * | 10/1994 | DiSanto | G09G 3/16 345/107 |
| 5,396,350 A | 3/1995 | Beeson et al. | |
| 5,596,671 A | 1/1997 | Rockwell, III | |
| 5,871,653 A | 2/1999 | Ling | |
| 5,959,777 A | 9/1999 | Whitehead | |

(Continued)

FOREIGN PATENT DOCUMENTS

| | | |
|---|---|---|
| AT | 333109 T | 8/2006 |
| CA | 2292441 C | 7/2002 |

(Continued)

OTHER PUBLICATIONS

International Search Report and Written Opinion dated Mar. 1, 2016 for PCT Application No. PCT/US2015/013725.

(Continued)

*Primary Examiner* — Joseph P Martinez

(74) *Attorney, Agent, or Firm* — Dianoosh Salehi

(57) ABSTRACT

Reflective image display architecture embodiments are disclosed comprising a perforated continuous reflective sheet. The perforated continuous sheet comprises a coating that provides a threshold to particle movement. The coating may be designed to provide a passive or electro-active physical barrier. The coating improves bistability of the display.

25 Claims, 9 Drawing Sheets

(56) References Cited

U.S. PATENT DOCUMENTS

| | | |
|---|---|---|
| 5,999,307 A | 12/1999 | Whitehead et al. |
| 6,064,784 A | 5/2000 | Whitehead et al. |
| 6,215,920 B1 | 4/2001 | Whitehead et al. |
| 6,304,365 B1 | 10/2001 | Whitehead et al. |
| 6,376,828 B1 | 4/2002 | Comiskey |
| 6,377,383 B1 | 4/2002 | Whitehead et al. |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,574,025 B2 | 6/2003 | Whitehead et al. |
| 6,751,008 B2 | 6/2004 | Liang et al. |
| 6,822,783 B2 | 11/2004 | Matsuda et al. |
| 6,842,279 B2 | 1/2005 | Amundson |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 7,046,439 B2 | 5/2006 | Kaminsky et al. |
| 7,093,968 B2 | 8/2006 | Hsueh et al. |
| 7,164,536 B2 | 1/2007 | Whitehead |
| 7,170,670 B2 | 1/2007 | Webber |
| 7,259,744 B2 | 8/2007 | Arango et al. |
| 7,286,280 B2 | 10/2007 | Whitehead et al. |
| 7,324,263 B2 | 1/2008 | Johnson et al. |
| 7,422,964 B2 | 9/2008 | Akiyama |
| 7,439,948 B2 | 10/2008 | Johnson et al. |
| 7,454,103 B2 | 11/2008 | Parriaux |
| 7,463,398 B2 | 12/2008 | Feenstra |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schultz et al. |
| 7,760,417 B2 | 7/2010 | Whitehead |
| 7,775,700 B2 | 8/2010 | Lee |
| 7,852,430 B1 | 12/2010 | Gettmey |
| 7,940,457 B2 | 5/2011 | Jain et al. |
| 8,022,615 B2 | 9/2011 | Bai et al. |
| 8,040,591 B2 | 10/2011 | Whitehead |
| 8,094,364 B2 | 1/2012 | Park |
| 8,384,659 B2 | 2/2013 | Yeo et al. |
| 8,587,512 B2 | 11/2013 | Hiji et al. |
| 8,690,408 B2 | 4/2014 | Li |
| 9,360,696 B1 | 6/2016 | Ghali et al. |
| 9,377,574 B2 | 6/2016 | Li |
| 2002/0089735 A1 | 7/2002 | Albert et al. |
| 2002/0171910 A1 | 11/2002 | Pullen et al. |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0214697 A1 | 11/2003 | Duthaler et al. |
| 2004/0136047 A1 | 7/2004 | Whitehead et al. |
| 2004/0174584 A1 | 9/2004 | Whitehead et al. |
| 2004/0239613 A1 | 12/2004 | Kishi |
| 2005/0007000 A1 | 1/2005 | Chou et al. |
| 2005/0270439 A1 | 12/2005 | Weber et al. |
| 2006/0056009 A1 | 3/2006 | Kombrekke et al. |
| 2006/0148262 A1 | 7/2006 | Lee et al. |
| 2006/0209418 A1 | 9/2006 | Whitehead |
| 2006/0291034 A1 | 12/2006 | Patty et al. |
| 2007/0008739 A1 | 1/2007 | Kim et al. |
| 2007/0019434 A1 | 1/2007 | Lee |
| 2007/0047003 A1 | 3/2007 | Suwabe |
| 2007/0091434 A1 | 4/2007 | Garner et al. |
| 2007/0263137 A1 | 11/2007 | Shigeta et al. |
| 2008/0174852 A1 | 7/2008 | Hirai et al. |
| 2008/0203910 A1 | 8/2008 | Reynolds |
| 2008/0204854 A1 | 8/2008 | Whitehead et al. |
| 2008/0219024 A1 | 9/2008 | Mi et al. |
| 2008/0231960 A1 | 9/2008 | Van Gorkom et al. |
| 2008/0266245 A1 | 10/2008 | Wilcox |
| 2008/0285282 A1 | 11/2008 | Karman et al. |
| 2008/0297496 A1 | 12/2008 | Watson et al. |
| 2008/0303994 A1 | 12/2008 | Jeng et al. |
| 2008/0304134 A1 | 12/2008 | Ban |
| 2009/0109172 A1 | 4/2009 | Lee et al. |
| 2009/0201565 A1 | 8/2009 | Bita et al. |
| 2009/0201570 A1 | 8/2009 | Frazier et al. |
| 2009/0207476 A1 | 8/2009 | Yanagisawa et al. |
| 2009/0225398 A1 | 9/2009 | Duthaler et al. |
| 2009/0231714 A1 | 9/2009 | Zhao et al. |
| 2009/0262083 A1 | 10/2009 | Parekh |
| 2009/0262414 A1 | 10/2009 | Whitehead |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0253711 A1 | 10/2010 | Muroi |
| 2011/0043435 A1 | 2/2011 | Hebenstreit et al. |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0293857 A1 | 11/2012 | Kwon et al. |
| 2013/0135320 A1 | 5/2013 | Govil |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0333989 A1 | 11/2014 | Whitehead |
| 2014/0340376 A1 | 11/2014 | Itagaki et al. |
| 2015/0146273 A1 | 5/2015 | Whitehead |
| 2016/0097961 A1 | 4/2016 | Whitehead |
| 2016/0139478 A1 | 5/2016 | Whitehead |
| 2016/0147128 A1 | 5/2016 | Loxley et al. |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1173208 C | 10/2004 |
| CN | 101160547 A | 4/2008 |
| CN | 1454327 A | 9/2008 |
| CN | 102955318 A | 3/2013 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| WO | 2003075085 | 9/2003 |
| WO | 2005010604 | 2/2005 |
| WO | 2006108285 | 10/2006 |
| WO | 2006114743 | 11/2006 |
| WO | 2014146937 | 9/2014 |
| WO | 2015116913 | 8/2015 |

(56) References Cited

FOREIGN PATENT DOCUMENTS

| WO | 2015175518 | 11/2015 |
|---|---|---|
| WO | 2016130720 | 8/2016 |

OTHER PUBLICATIONS

International Search Report and Written Opinion dated Jan. 27, 2016 for PCT Application No. PCT/US2015/054385.
International Search Report and Written Opinion dated Mar. 2, 2016 for PCT Application No. PCT/US2015/062075.
International Search Report and Written Opinion dated Apr. 13, 2016 for PCT Application No. PCT/US2015/066980.
International Search Report and Written Opinion dated Apr. 21, 2016 for PCT Application No. PCT/US2016/017416.
International Search Report and Written Opinion dated Mar. 28, 2016 for PCT Application No. PCT/US2015/0066150.
Gou, S. et al., "Transparent Superhydrophobic Surfaces for Applications of Controlled Reflectance" Applied Optics vol. 51, Issue No. 11, Apr. 10, 2012, pp. 1645-1653.
Whitehead, L. et al., "The Many Roles of Illumination in Information Display" Society for Information Display Symposium (Invited Paper), Issue No. 0097-966X/06/3701-0000, May 2010.
Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.
Whitehead, L. et al., "Reflections on Total Internal Reflection" Optics and Photonics News Feb. 2009, pp. 28-34.
Mossman, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 44, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, EURODISPLAY Oct. 2002, pp. 851-854.
Mossman, M. et al., "New Reflective Color Display Technique Based on Total Internal Reflection and Subtractive color Filtering" International Conference of the Society for Information Display, San Jose, CA Issue No. 1-0966X/1/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective isplay Based on Total Internal Reflection in Prismatic Microstructures" Proceedings of the 2000 Society for Information Display, International Display Research Conference, Issue No. 1083-1312/00/2001-0311, Oct. 2000, pp. 311-314.
International Search Report and Written Opinion dated Jul. 8, 2014 for PCT Application No. PCT/US2013/049606.
International Search Report and Written Opinion dated Dec. 30, 2014 for PCT Application No. PCT/US2014/058118.
International Search Report and Written Opinion dated Aug. 11, 2014 for PCT Application No. PCT/US2014/030966.
International Search Report and Written Opinion dated Sep. 19, 2014 for PCT Application No. PCT/US2014/038091.
International Search Report and Written Opinion dated Oct. 1, 2015 for PCT Application No. PCT/US2015/030349.
International Search Report and Written Opinion dated Apr. 3, 2015 for PCT Application No. PCT/US2014/061911.
Mossman, M. A. et al., "A Novel Reflective Image Display Using Total Internal Reflection" Displays Devices, DEMPA Publications, Tokyo JP vol. 25, No. 5 Dec. 1, 2004 pp. 215-221.
Mossman et al. "Brightness Enhancement in TIR-Modulated Electrophoretic Reflective Image Displays", (Biblio).
Atsuhito et al. "Electrophoresis Device, Method of Manufacturing the Electrophoresis Device, Display, Display Substrate, and Electronic Unit", (Abstract).

* cited by examiner

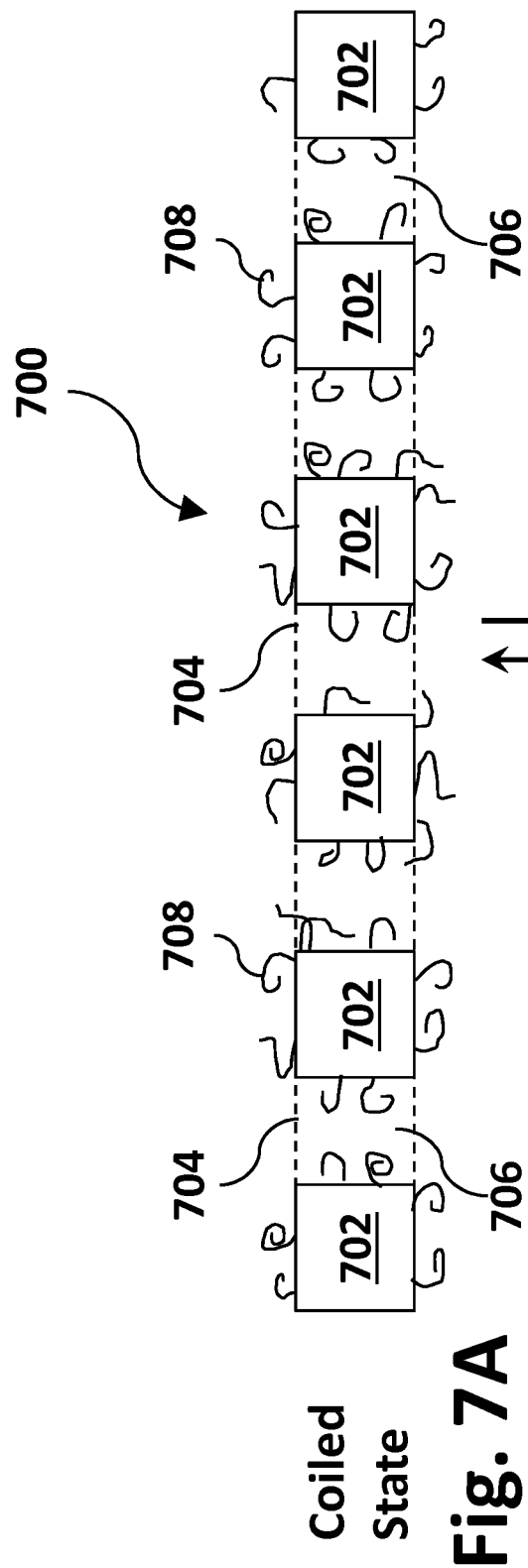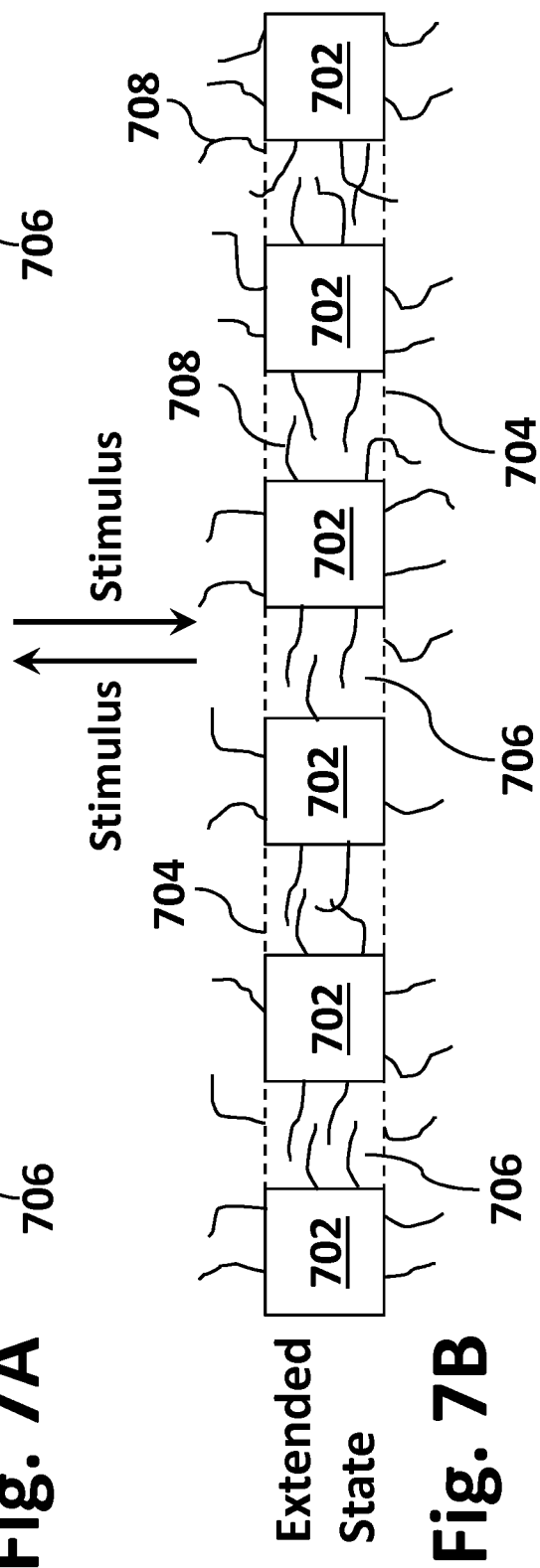

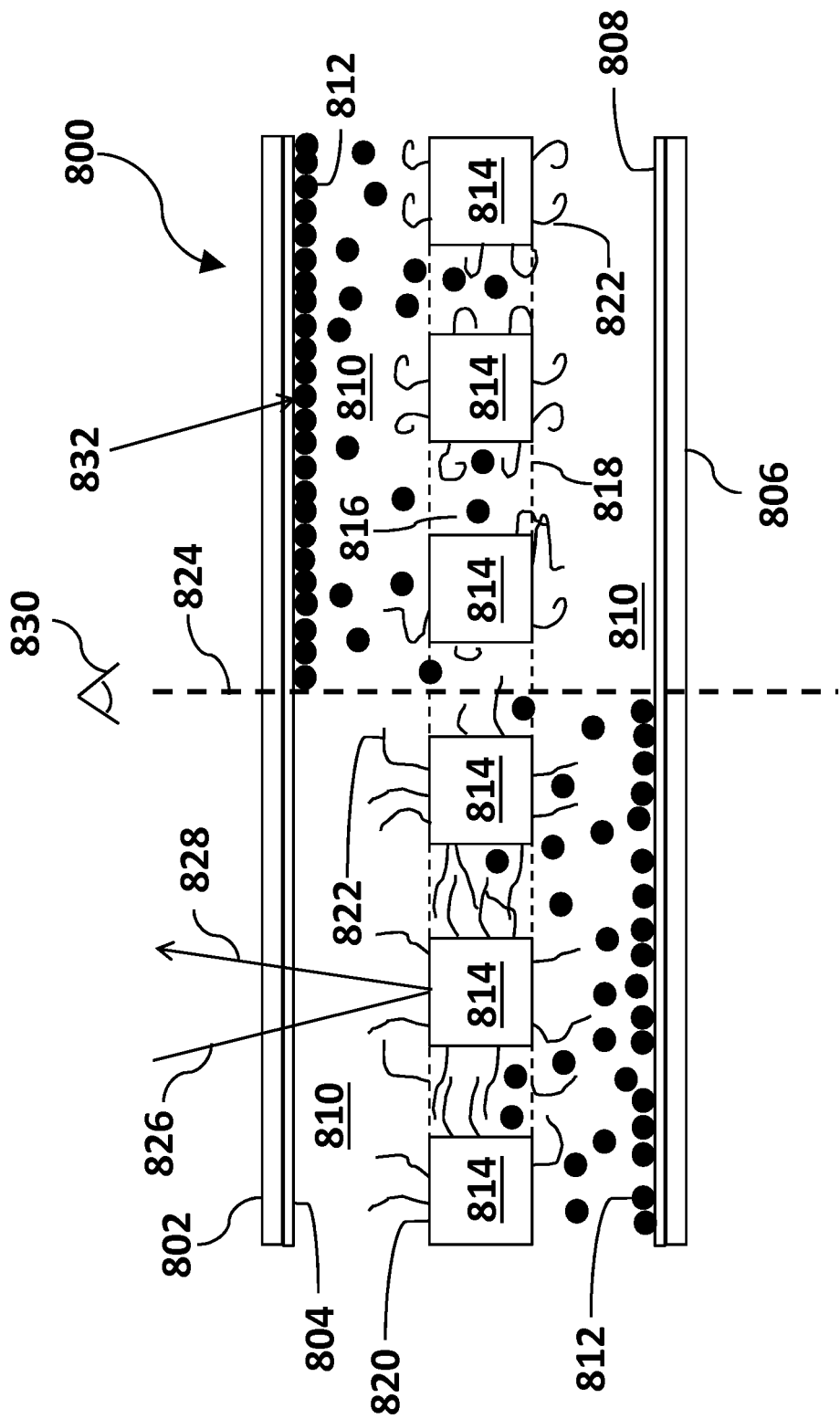

REFLECTIVE IMAGE DISPLAY WITH THRESHOLD

This application claims priority to the filing date of Provisional Application No. 62/060,652, filed Oct. 7, 2014; the specification of which is incorporated herein in its entirety.

FIELD

The disclosure generally relates to driving reflective image displays utilizing frustration of total internal reflection (TIR) in high brightness, wide viewing angle displays. More particularly, the application pertains to reflective image displays containing a threshold.

BACKGROUND

A frustratable total internal reflection (FTIR) image display is potentially a much faster switching reflective display technology that enables web browsing and video applications. FTIR display technology utilizes TIR of a front sheet or film comprising of, for example, convex or hemispherical protrusions or micro-prisms to create a bright state. A dark state is created by frustration of TIR when light absorbing particles are moved adjacent the front sheet into the evanescent wave region. The switching speed of an FTIR-based display can be faster than conventional dual particle electrophoretic display technology. This is due to the modulation of particles of only one charge. The particles need to be moved in and out of the evanescent wave region at the hemisphere surface. This distance is much shorter than the movement distance in conventional electrophoretic displays.

FTIR-based displays may be addressed to move the light absorbing charged particles. The movement of the charged particles from one electrode to another creates images. The charged particles may be moved using different methods such as direct drive addressing of a patterned electrode array, active matrix addressing of a thin film transistor (TFT) array and passive matrix addressing of a grid array of electrodes.

In direct drive displays, a display is divided into a plurality of segments in a patterned array. Each display segment has an individual lead to control the segment. Although the patterned array and drive electronics are less expensive to fabricate, direct drive displays are greatly limited. As the number of segments in the display increases, the number of leads also increases thereby making the display difficult or even impossible to fabricate.

Thin film transistor (TFT) arrays are commonly used in current liquid crystal display (LCD) technologies and contain a plurality of transistors and capacitors. Each capacitor and transistor is connected to a single pixel, which actively maintains the pixel state while other pixels are being addressed. The advantage of the TFT approach is that the capacitor/transistor combination provides a threshold voltage that enables individual pixels to be addressed using row/column drivers. This is needed if the electro-optical system (e.g., the liquid crystal (LC), the electrophoretic suspension, etc.) does not have an intrinsic voltage threshold. TFT systems are faster and have better voltage control. The fundamental advantage of the TFT array is the ability to control each pixel with the threshold voltage. TFT arrays provide drive systems for displays requiring fine structure and detail. However, the TFT arrays are costly to manufacture.

Passive matrix driven displays are composed of an array of electrodes in a grid structure. The grid structure is made of rows and columns with each respective row and column connected to an integrated circuit (IC). The ICs supply charge to the row and column electrodes to address individual pixels at locations where the rows and columns intersect. Passive matrix displays are simple and low cost to manufacture. Passive matrix displays can provide fine structure and image quality but they have major drawbacks. For example, passive matrix driven displays have slow response times and poor voltage control. In addition, the electro-optical systems of such displays require an intrinsic threshold behavior in the LC or electrophoretic suspension portion of the display. Despite the slow response time, passive matrix displays can be used in a variety of applications that require fine image structure without the need for video rate. Such applications include: electronic shelf labels, billboards and other types of display signage that would be cheaper to fabricate than with TFT drive electronics. Poor voltage control, another drawback, can lead to poor image quality.

FIG. 1 schematically illustrates a portion of a conventional passive matrix grid 100 of electrodes containing a first plurality 102 of rows of individual electrodes 104. Opposing the plurality of row electrodes 102 is a second plurality 106 of columns of individual column electrodes 108 in a perpendicular direction to the first plurality of row electrodes 102. The individual pixels are located where the row and column electrodes intersect. In order to address, for example, the middle pixel (the pixel is highlighted by a dotted line box) of the grid array 100, a first voltage is applied at +10V at the middle column electrode while the other electrodes remain at 0V. A second applied voltage bias of −10V is applied at the middle row electrode while the other row electrodes remain at 0V to form an electromagnetic field therebetween. The voltage difference leads to an overall voltage bias at the desired middle pixel of +20V. An undesired voltage bias of +10V is also applied to the adjacent pixels. Preferably, these pixels would not be addressed at +10V but as mentioned in preceding paragraphs, passive matrix displays exhibit poor voltage control. Regardless of the pixel addressed in a specific row or column, all other pixels in the same row or column of said pixel are addressed by an applied voltage, albeit at a lower voltage than the desired addressed pixel.

In the schematic example in FIG. 1, the desired pixel is addressed at +20V and activated while all of the other pixels in the same row and column are addressed at +10V. Unwanted partial activation of the pixels being addressed at +10V may result. A key method to circumvent this problem is to implement a threshold into the display such that the pixels are not activated when a voltage of +10V is applied. Instead, pixels are activated only when a voltage of >10V, such as when +20V is applied. This method, however, has many drawbacks.

BRIEF DESCRIPTION OF DRAWINGS

These and other embodiments of the disclosure will be discussed with reference to the following exemplary and non-limiting illustrations, in which like elements are numbered similarly, and where:

FIG. 7A is a cross-section of a perforated sheet comprising a stimuli-responsive coating in the coiled state;

FIG. 7B is a cross-section of a perforated sheet comprising a stimuli-responsive coating in the extended state;

FIG. 8 is a portion of a reflective display comprising a perforated sheet with a stimuli-responsive coating.

DETAILED DESCRIPTION

Figure 1:
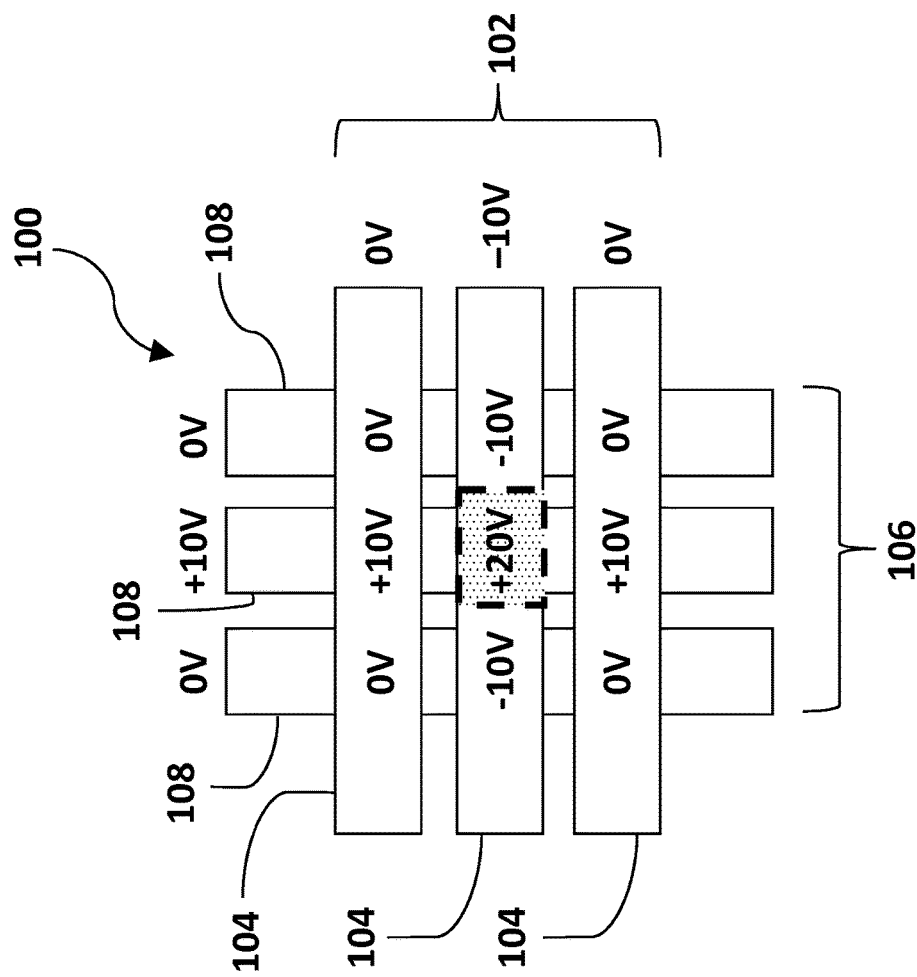
FIG. 1 schematically illustrates a portion of a conventional passive matrix electrode grid.

Throughout the following description specific details are set forth in order to provide a more thorough understanding to persons skilled in the art. However, well-known elements may not have been shown or described in detail to avoid unnecessarily obscuring the disclosure. Accordingly, the description and drawings are illustrative not restrictive.

In one embodiment, the disclosed principles provide a method and apparatus to provide a threshold in passive matrix driven FTIR-based displays and other reflective display architectures. In an exemplary embodiment, a perforated sheet comprising a coating is interposed between the first electrode and the second electrode. The perforated sheet with coating provides a threshold for the movement of electrophoretic particles between the first and the second electrodes.

In one embodiment of the disclosure, a passive matrix display includes a group of first electrodes and a group of second electrodes. The first group and the second group of electrodes are positioned perpendicular with respect to each other. The electrodes are connected to ICs capable of applying a charge to each individual electrode. For reflective image displays, the electrophoretically mobile particles suspended in a medium are positioned in the cavity between the opposing first and second electrodes.

In certain embodiments, a perforated sheet with coating is interposed between the first group and second group of opposing electrodes. The perforated sheet may be a continuous wire mesh. The perforated sheet may comprise a reflective layer. The perforated sheet may comprise a coating of a material that provides a passive physical barrier to passage of electrophoretically mobile particles. The perforated sheet may comprise a coating of a stimuli-responsive material that provides a physical barrier to passage of electrophoretically mobile particles. By controlling the stimulus applied to the perforated sheet with a stimuli-responsive coating, certain embodiments provide a threshold to prevent particles from moving during operation while addressing other pixels in the same row or column. The disclosed embodiments further impart bistability to the display architecture. Bistability occurs when the display retains its image when the power is off or is at a non-driving voltage.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, look-up table and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 2:
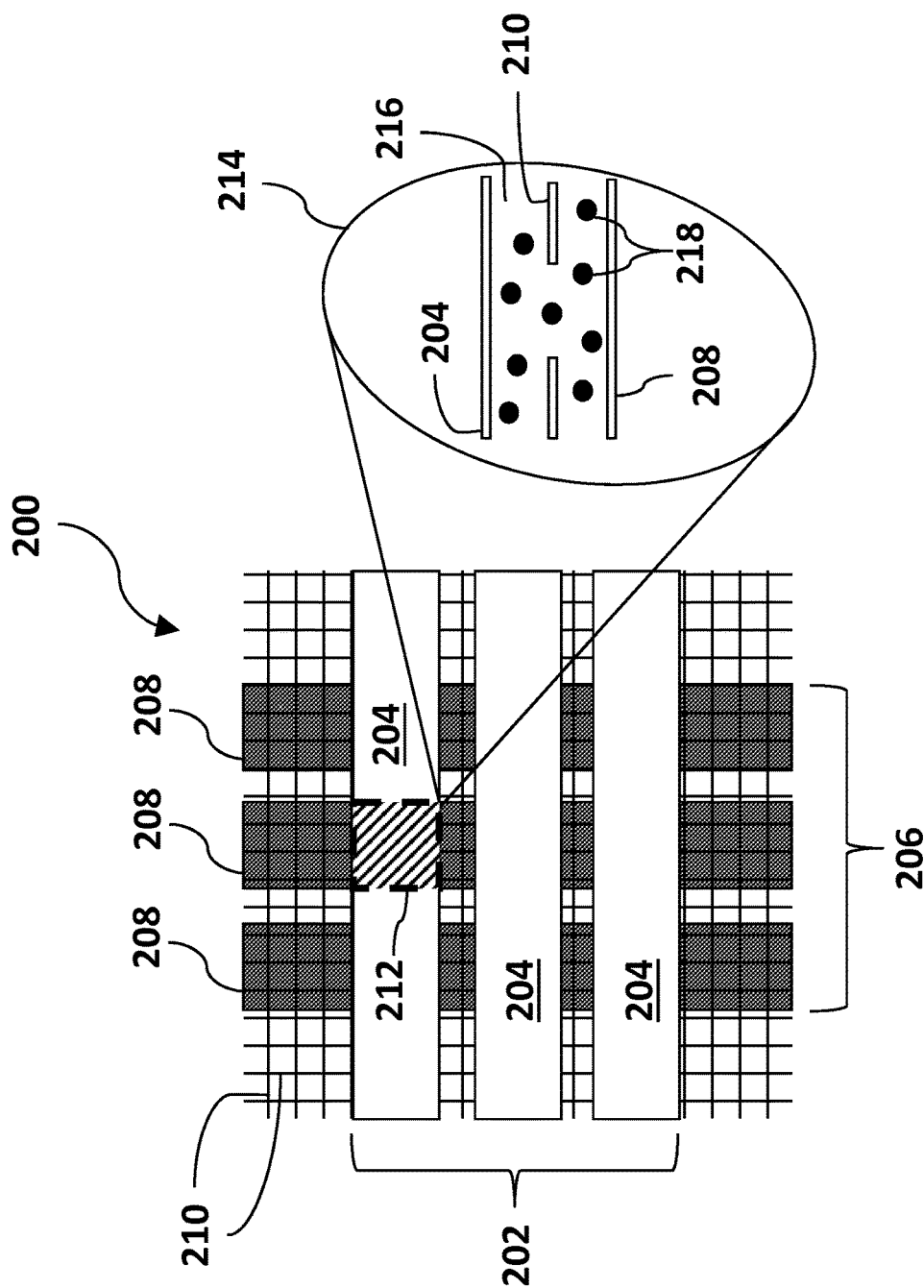
FIG. 2 schematically illustrates a portion of a passive matrix electrode grid comprising a perforated sheet.

FIG. 2 is a schematic illustration of one embodiment of the disclosure. Specifically, FIG. 2 illustrates a portion of a passive matrix electrode grid having a porous sheet with coating. The passive matrix grid 200 with a porous sheet contains a first plurality of front (interchangeably, frontward) row electrodes 202 made up of individual row electrodes 204. Grid 200 also includes a second plurality of rear (interchangeably, rearward) column electrodes 206 made up of individual column electrodes 208 (column electrodes 208 have been darkened for clarity).

The frontward row electrodes 204 may be substantially transparent and may comprise indium tin oxide (ITO), an electrically conducting polymer such as BAYTRON® or nanoparticles dispersed in a transparent polymer such as carbon nanotubes or metallic nanowires made from silver or other metals.

The column electrodes may be transparent or non-transparent. Column electrodes 208 may also be made of carbon or conductive metals such as aluminum, copper, silver or gold or other electrically conductive material or a combination thereof. A cavity is formed between the plurality of front 202 and plurality of rear 206 electrodes.

FIG. 2 also shows perforated sheet 210 interposed between frontward plurality of row electrodes 202 and rearward plurality of column electrodes 206. In the embodiment of FIG. 2, perforated sheet 210 is illustrated as a continuous wire mesh. A wire mesh-like design is presented for descriptive purposes and should not limit the scope of the disclosed principles.

An individual pixel 212 located at the intersection of the top row electrode and middle column electrode and is exploded as 214 for illustrative purposes. Pixel 212 includes front 204 electrode, rear electrode 208 and perforated sheet 210. In addition, pixel 212 is highlighted by a box with dotted lines and filled by cross-hatched lines. Exploded view 214 illustrates a cross sectional view of a front row electrode 204, a cross-sectional view of a rear column electrode 208 and a cross-sectional view of the perforated sheet 210 which is interposed between the front and the rear electrodes. In one embodiment, at least one aperture of the perforated sheet 210 interposes a span between one of the plurality 202 of the frontward row electrodes and one of the plurality 206 of the rearward column electrodes.

A voltage source (not shown) may additionally supply substantially uniform voltages to the each of the electrodes. The voltage source may independently bias each of the electrodes. Alternatively, the voltage source may bias one or both of the electrodes as a function of the bias applied to the other electrode(s) to create an electromagnetic field therebetween. A controller comprising a processor circuitry, memory circuitry and switching circuitry may be used to drive each of the electrodes. The memory circuitry may store instructions to drive the processor circuitry and the switching circuitry thereby engaging and disengaging electrodes according to predefined criteria.

The passive matrix grid 200 may also include a fluidic medium 216. The medium may be disposed in a housing (not shown) that contains all three electrodes. The medium may partially or completely fill the spaces between and around front electrodes 204 and rear electrodes 208 and within the apertures of the perforated sheet. The medium may be air, a clear liquid, any other suitable fluidic medium or a combination of different materials. In other embodiments, the medium may be colored. The medium may be a fluorinated inert, low refractive index, low viscosity liquid such as a fluorinated hydrocarbon. An inert, low refractive index (i.e., less than about 1.35), low viscosity, electrically insulating liquid such as, Fluorinert™ perfluorinated hydrocarbon liquid ($\eta_3$~1.27) available from 3M, St. Paul, Minn., may be a suitable fluid for the medium. Other liquids such as Novec™ also available from 3M may also be used as the fluid for the medium.

The passive matrix grid 200 may further include at least one or a plurality of electrophoretically mobile light absorbing particles 218. The particles may be suspended in the fluidic medium 216 disposed between the plurality of front 202 and rear 206 electrodes. The particles may have a positive or negative charge. The particles may comprise inorganic material such as a metal oxide-based pigment. The particles may comprise a carbon-based material such as carbon black or other carbon-based pigment. The particles may comprise a combination of inorganic and carbon based material. In one embodiment, the particles may comprise a metal oxide-based core material with an outer layer or coating of adhered polymer. In another embodiment, the particles may comprise a carbon-based core such as carbon black or graphite with an outer layer or coating of adhered polymer. In other embodiments the particles may comprise a dye.

Figure 3:
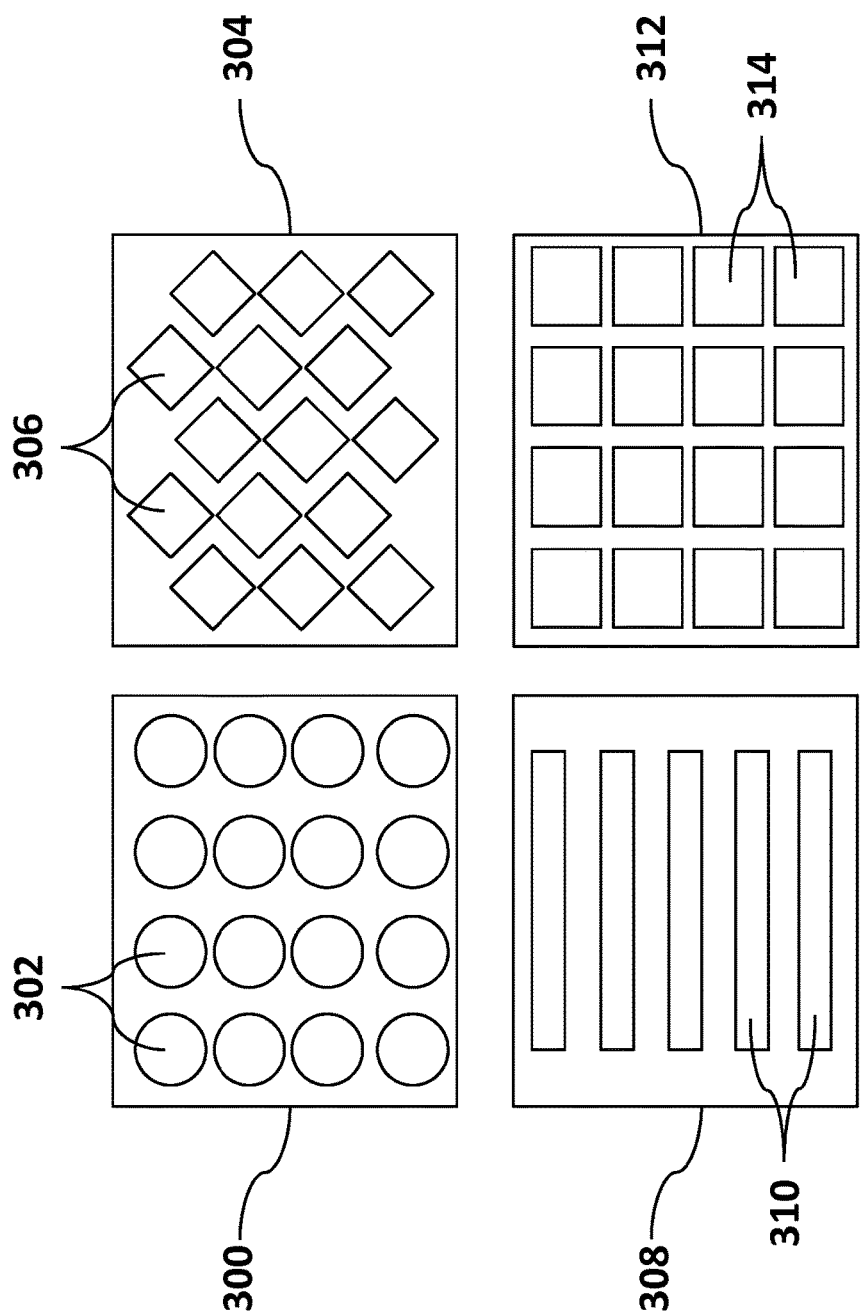
FIG. 3 schematically illustrates design variations of the third electrode.

FIG. 3 schematically illustrates design variations of the perforated sheet. Specifically, FIG. 3 shows the top view of various exemplary designs for the perforated sheet. In FIG. 2 the perforated sheet 210 was depicted as a continuous wire mesh for illustrative purposes only. The perforated sheet may also be, for example, in the form of a continuous perforated sheet 300 with circular perforations 302, a continuous perforated sheet 304 with diamond perforations 306, a continuous perforated sheet 308 with rectangular perforations 310 or a continuous perforated sheet 312 with square perforations 314, or combinations thereof. The perforations, troughs or apertures allow particles passage through the porous sheet. The perforations may further be random in size and distribution. Perforation density of the porous sheet (e.g., sheet 210, FIG. 2) may also vary and may have high perforation density such as in a wire mesh of at least about 60%. In other words, the perforations may constitute at least about 60% of the total surface area of the porous sheet. The perforated sheet 210 may have low perforation density of at least about 10%. Perforation density may range from about 10% to about 90% or more. In one embodiment, the diameters of the perforations are substantially greater than the diameter of an average electrophoretic particle. For example, the aperture diameter may be at least about 10 times the average diameter of the electrophoretically mobile particles. The perforated sheet may be comprised of a metal, glass or plastic.

Figure 4:
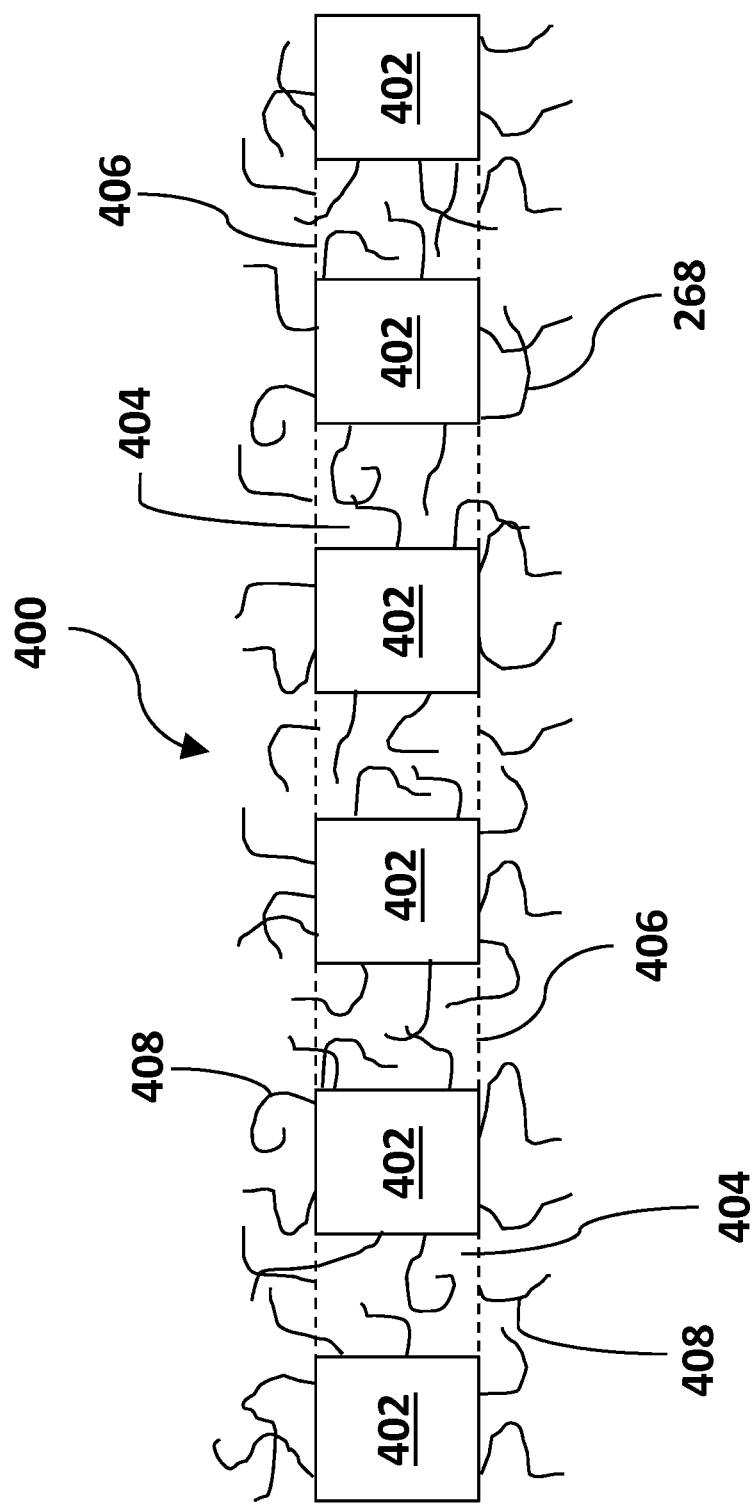
FIG. 4 is a cross-section of a perforated sheet with a coating.

FIG. 4 is a cross-section of a perforated sheet comprising a coating according to one embodiment of the disclosure. Design 400 illustrated in FIG. 4 first comprises a sheet 402 with perforations 404. Sheet 402 may be continuous and represented by dotted lines 406. The continuous perforated sheet 402 further comprises a coating 408. In an exemplary embodiment the coating 408 may comprise a polymer. In another embodiment the coating may comprise an oligomer. In another embodiment the coating may comprise a small molecule. Other combinations of materials may be used equally without departing from the disclosed principles.

The coating 408 may be formed on the perforated sheet 402 by grafting polymer to the surface. The perforated sheet may be pre-treated with a material that includes anchor sites on the surface. Anchor sites may link the polymer to the surface as needed. Another method to attach coating 408 to the surface is to first coat the surface with a material having a monomer with a polymerizable functional group or a moiety such that polymer chains may be grown from the surface. Other methods may also be used to attach polymer to the surface. Coating 408 may comprise one of the families of polymers of polyacrylates, polymethacrylates, polystyrenes, polypropylenes, polyethylenes, polyethyleneterepthalates, polyimides or a combination thereof. The polymer may have a flexible or rigid backbone structure or a combination of flexible and rigid portions. The polymers may be located on the top and bottom surfaces of the sheet 402 and on the internal surfaces of the perforations 404.

The polymer chains of coating 408 may act as a passive physical barrier to the electrophoretically mobile particles that pass through the perforations of sheet 402. Coating 408 prevents particle migration through the perforations in the absence of an applied voltage bias. This provides bistability in the display. Coating 408 prevents particle migration through the perforations when voltages are applied below a threshold value. When an above-threshold voltage (or bias) is applied, the particles overcome the resistance provided by the polymer chains at or near the interior surface of the perforations. The particles are thus electrophoretically forced through the perforations towards the front or rear electrode.

In some embodiments the polymers are long chains providing increased resistance (e.g., tortuous path) for particles to pass through the perforations. As the polymer chains are lengthened the required threshold voltage may increase. In other embodiments the polymers may have a more rigid structure to increase the resistance to particle movement thereby requiring a higher threshold voltage. In other embodiments, coatings comprising oligomeric molecules with regular chain lengths may be used. Chain lengths of uniform length (i.e. low polydispersity) coated onto the perforated sheet may provide a uniform threshold. These types of coatings may be used instead of polymers or in combination with polymers with the embodiments described herein.

Figure 5:
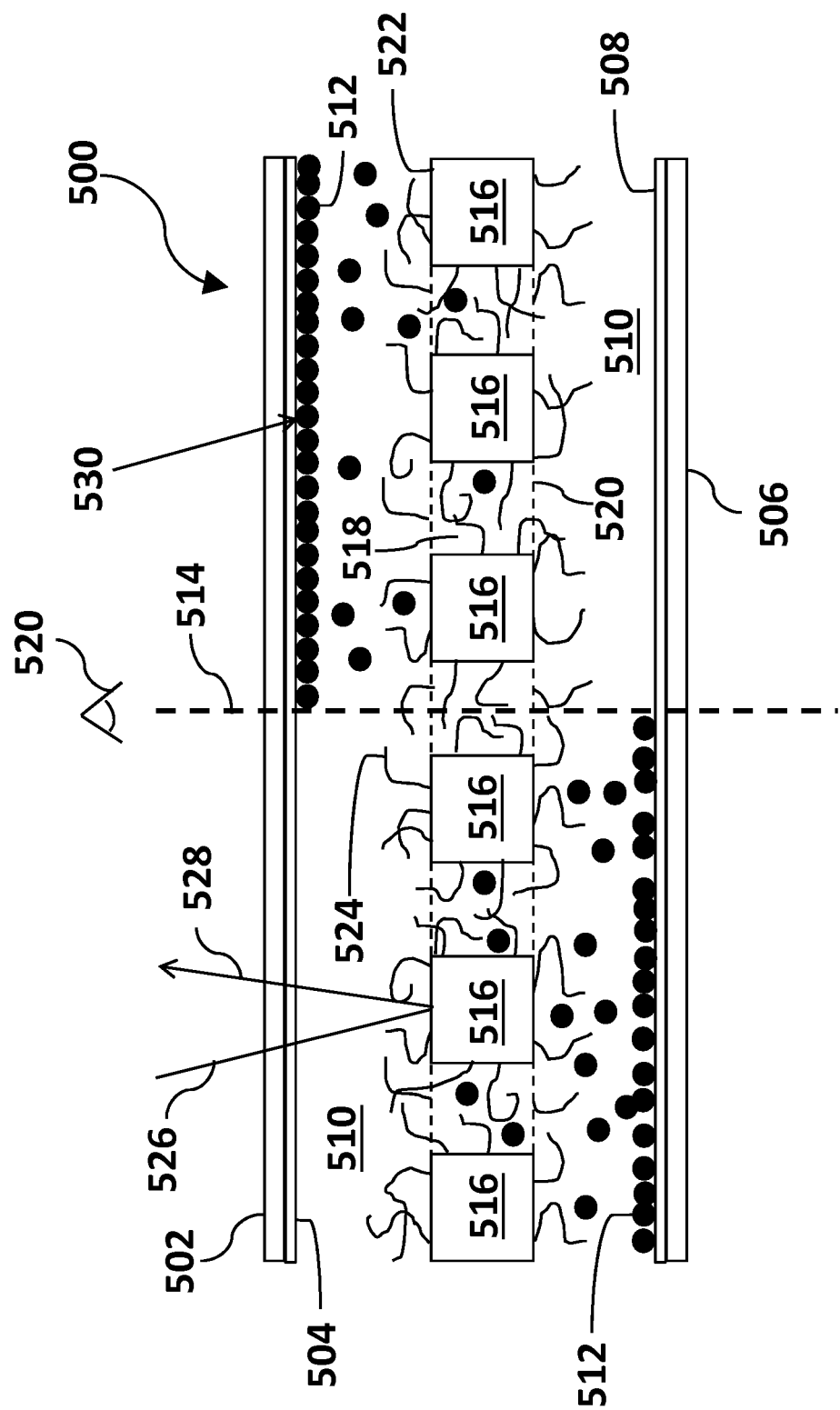
FIG. 5 is a portion of a reflective display comprising a perforated sheet with a coating.

FIG. 5 is a portion of a reflective display comprising a perforated sheet with a coating. Specifically, FIG. 5 shows a reflective display with a reflective perforated sheet with a coating that provides a threshold. Display 500 comprises an outward transparent front sheet 502, transparent front electrode 504, rear support 506 and rear electrode layer 508. Display 500 further comprises a medium 510 contained within the cavity formed by the front electrode layer 504 and the rear electrode layer 508. Suspended within the medium 510 are electrophoretically mobile particles 512. Further contained within the cavity is a continuous perforated sheet 516 that is similar to sheet in FIG. 4. Sheet 516 comprises perforations 518. Dotted lines 520 represent the continuous nature of sheet 516. Sheet 516 comprises a light reflective layer 522. The perforated sheet 516 further includes a coating 524. Display 500 may further comprise at least one voltage source (not shown).

In some embodiments the transparent front electrode 504 may comprise indium tin oxide (ITO). In other embodiments front electrode 504 may comprise a transparent electrically conducting polymer. In other embodiments front electrode 504 may comprise Baytron™. In other embodiments front electrode 504 may comprise electrically conductive nanoparticles, such as silver, dispersed in a transparent polymer matrix.

In some embodiments display 500 may include a dielectric layer on front electrode 504. In other embodiments display 500 may include a dielectric layer on rear electrode 508. In other embodiments display 500 may include a dielectric layer on the front electrode 504 and rear electrode 508. Dielectric layers provide protective layers for the electrodes. The dielectric layers may be composed of an inorganic material or organic material or a combination thereof. In some embodiments the dielectric layers may be composed of a polymer such as parylene. In other embodiments the dielectric layers may be composed of halogenated parylenes such as parylene C, parylene D, parylene F or parylene AF-4. In other embodiments the dielectric layer may be $SiO_2$ or a combination of $SiO_2$ with parylene or with a halogenated parylene.

In some embodiments the rear electrode 508 may comprise a TFT array, a direct drive patterned array or an active matrix array of grid electrodes.

In an exemplary embodiment, medium 510 is a transparent fluid or liquid such as a hydrocarbon. In other embodiments medium 510 may be fluorinated hydrocarbon. In other embodiments medium 510 may be air. In other embodiments medium 510 may be colored such as with a dye.

In some embodiments the electrophoretically mobile particles 512 may be positively or negatively charged. In some embodiments the electrophoretically mobile particles 512 may absorb incident light rays. In other embodiments the electrophoretically mobile particles 512 may reflect incident light rays. In other embodiments the electrophoretically mobile particles 512 comprise a metal oxide. In other embodiments the electrophoretically mobile particles 512 comprise a dye. In other embodiments the electrophoretically mobile particles 512 comprise a metal oxide with a polymer coating. In other embodiments the electrophoretically mobile particles 512 comprise carbon black.

In an exemplary embodiment sheet 516 comprises a plastic. In other embodiments sheet 516 comprises glass or a metal. In an exemplary embodiment sheet 516 comprises a light reflection layer on top facing the transparent outer sheet 502. The light reflection layer may be a metal or metal oxide such as $TiO_2$. Sheet 516 may be of any design as described in FIG. 3. The coating 524 on sheet 516 acts as a physical barrier to movement of particles through the perforations as described in FIG. 3. Coating 524 may comprise of a material described in illustration 400 in FIG. 4. In an embodiment, sheet 516 may absorb light and be used in combination with electrophoretically mobile particles 512 that reflect light.

A voltage source (not shown) may additionally supply substantially uniform voltages to the front and rear electrodes. The voltage source may independently bias each of the electrodes. Alternatively, the voltage source may bias one or both of the electrodes as a function of the bias applied to the other electrode(s). A controller comprising processor circuitry, memory circuitry and switching circuitry may be used to drive each of the electrodes. The memory circuitry may store instructions to drive the processor circuitry and the switching circuitry thereby engaging and disengaging electrodes according to predefined criteria.

In order to control the gap between any two adjacent electrodes, spacer structures may be used in display 500. The spacer structures may also be used to support the various layers in the display. The spacer structures may be in the shape of circular or oval beads, blocks, cylinders or other geometrical shapes or combinations thereof. The spacer structures may comprise glass, metal, plastic or other resin.

The display 500 in FIG. 5 is operated a follows. On the left side of the dotted line 514, the charged particles 512 are attracted to a voltage of opposite polarity at the rear electrode 508 (in some embodiments the particles may be negatively charged and attracted to a positive voltage bias. In other embodiments the particles may be positively charged and attracted to a negative voltage bias). The particles are held in the rear of the display behind sheet 516. They are trapped in the region between the bottom surface of the perforated sheet 516 and the surface of the rear electrode layer 508. The coating of polymer 524 restricts movement of the particles. The polymer chains of coating 524 act as a barrier to movement of the electrophoretically mobile particles 512 when a voltage is applied that is below the threshold. Incident light, represented by light ray 526, may be reflected off of the reflective surface 522 of the perforated sheet. The reflected light ray 528 is reflected back toward the viewer 520 to create a light or bright state of the display.

When a bias of opposite polarity is applied at the front electrode 504 above the threshold voltage, the electrophoretically mobile particles are forced through the perforations 518 of sheet 516. The coating 524 is not able to hold the particles back when a bias is applied above the threshold. The charged particles 512 are attracted to the front electrode 504 where a bias of opposite polarity is applied. The particles collect near the surface of the front electrode layer 504. The particles 512 absorb incident light that passes through the transparent front sheet 502. This is represented by light ray 530 being absorbed by particles 512. This results in a dark state of the display. In the absence of a bias, the coating may impart bistability by preventing the particles from migrating away from the front and rear electrodes.

In another embodiment of display 500 illustrated in FIG. 5, the particles may be charged of one polarity and the polymer chains of the coating may be charged of a different polarity. Thus there is an attraction of the particles to the polymer chains. The attractive force of the particles to polymer chains provides a threshold force must be overcome by an applied bias. A bias must be applied above a threshold voltage bias in order for the particles to pass through the perforations.

Figure 6:
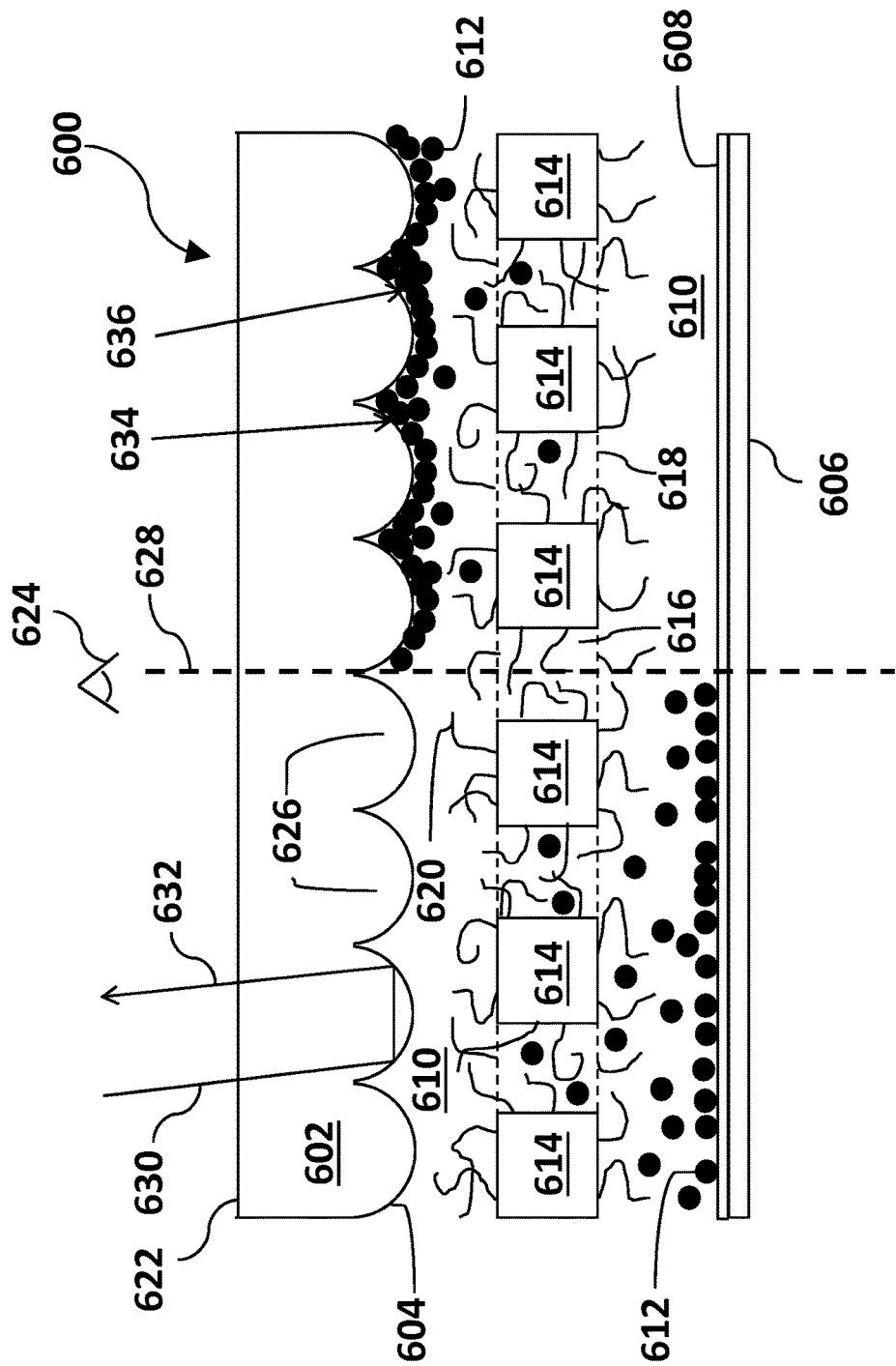
FIG. 6 is a portion of a TIR-based display comprising a perforated sheet with a coating.

FIG. 6 is a portion of a TIR-based display comprising a perforated sheet with a coating. Specifically, FIG. 6 shows a TIR-based display with a reflective perforated sheet with a coating that provides a threshold. Display 600 is similar to display 500 but with a different front sheet design. Display 600 comprises an outward transparent front sheet 602, transparent front electrode 604, rear support 606, rear electrode layer 608 and a medium 610 contained within the cavity formed by the front electrode layer 604 and the rear electrode layer 608. Suspended within the medium 610 are electrophoretically mobile particles 612. Further contained within the cavity is a continuous perforated sheet 614 with perforations 616 that is similar to sheet 402 in FIG. 4. Dotted lines 618 represent the continuous nature of sheet 614. The perforated sheet 614 comprises a coating 620. In some embodiments display 600 may further comprise a voltage source (not shown). In other embodiments display 600 may further comprise spacer structures. In other embodiments display 600 may further comprise at least one dielectric layer.

Outward transparent front sheet 602 comprises a flat outward surface 622 facing viewer 624. Sheet 602 further comprises a large plurality of high refractive index (e.g.

$\eta_1 > \sim 1.90$) transparent convex protrusions 626 at the inward surface. In some embodiments the convex protrusions may be in the form of "hemispheres", "hemi-beads", "beads", "hemispherical protrusions" or "prisms". Hemispheres are arranged closely together to form an inwardly projecting monolayer having a thickness approximately equal to the diameter of one of hemispheres 626. Ideally, each one of hemispheres 626 touches all of the hemispheres immediately adjacent to that one hemisphere. Minimal interstitial gaps (ideally, no gaps) remain between adjacent hemispheres. Regardless of the design, the hemispheres may be configured for TIR. They may be used interchangeably in FTIR-based display embodiments described herein.

Display 600 comprises a medium 610 that is maintained adjacent the hemispherical protrusions 626. The medium 610 may be air or a liquid or fluid. Medium 610 may be an inert, low refractive index (i.e., less than about 1.35), low viscosity, electrically insulating fluid. In some embodiments medium 610 comprises a perfluorinated hydrocarbon liquid.

The display 600 in FIG. 6 may be operated a follows. On the left side of the dotted line 628, the charged particles 612 are attracted to a voltage of opposite polarity at the rear electrode 608. The particles are held in the rear of the display behind sheet 614. They are held in the region between the bottom surface of the perforated sheet 614 and the surface of the rear electrode layer 608. The coating of polymer 620 restricts movement of the particles. Coating 620 acts as a barrier to movement of the electrophoretically mobile particles 612 when a voltage is applied that is below the threshold. Incident light, represented by light ray 630, may be totally internally reflected at the surface of the hemispherical protrusions 626. The reflected light ray 632 is reflected back toward the viewer 624 to create a light or bright state of the display.

It should be noted that in some embodiments, a light reflective layer may optionally be added to the top surface of sheet 614 facing the inward hemispherical surface of sheet 602. Some light rays may pass through the dark pupil region of the hemispherical protrusions and be lost. With a reflective layer, these light rays may instead be reflected back through the hemispherical protrusions toward viewer 624 to enhance the brightness of the display.

When a bias of opposite polarity is applied at the front electrode 604 above the threshold voltage, the electrophoretically mobile particles are forced through the perforations 618 of sheet 614. The coating 620 is not able to hold the particles back when a bias is applied above the threshold. The charged particles 612 are attracted to the front electrode 604 where a bias of opposite polarity is applied. The particles collect near the surface of the front electrode layer 604 and enter the evanescent wave region. The particles 612 frustrate TIR and absorb incident light rays that pass through the transparent front sheet 602. This is represented by light rays 634 and 636 being absorbed by particles 612. This results in a dark state of the display. In the absence of a bias, the coating may impart bistability by helping to prevent the particles from migrating away from the front and rear electrodes.

In another embodiment of display 600 illustrated in FIG. 6, the particles may be charged of one polarity and the polymer chains of the coating may be charged of a different polarity. Thus, there is an attraction of the particles to the polymer chains. The attractive force of the particles to the polymer chains provides a threshold force, which must be overcome by an applied bias. A bias must be applied at or above a threshold voltage bias in order for the particles to pass through the perforations.

System 700 of FIGS. 7A and 7B illustrates a perforated sheet with stimuli-responsive coating embodiment. FIG. 7A is a cross-section of a perforated sheet comprising a stimuli-responsive coating in the coiled state. Sheet 702 may be similar to sheet 402 of FIG. 4. Perforated sheet 702 is a continuous sheet. Dotted lines 704 represent the continuous nature of the sheet. Sheet 702 comprises perforations 706. Design embodiments of the perforated sheet may be in various forms as described in FIG. 3. Perforated sheet 702 further comprises a stimuli-responsive coating 708. While coating 708 may have a different physical shape, in FIG. 7 the coating 708 is depicted in the coiled state in FIG. 7A.

In an exemplary embodiment the coating 708 may comprise a stimuli-responsive polymer. In other embodiments the coating may comprise a stimuli-responsive oligomer or a small molecule or a combination thereof. The coating may change shape, orientation, length, polarity or solubility by a stimulus. The coating may be responsive to stimuli such as voltage, electrical current (such as an actuator), temperature or light. In an exemplary embodiment coating 708 is electroactive. In another embodiment the perforated sheet and coating may be replaced with a micro-electro-mechanical system (MEMS).

Depicted in FIG. 7A, the coating changes shape in a response to a stimuli to allow passage of particles through the perforations 706. Coating 708 is represented by pendant polymer chains. The polymer chains of the coating coil up. This removes the barrier to allow for particles to pass through.

FIG. 7B is a cross-section of a perforated sheet comprising a stimuli-responsive coating in the extended state. In response to a stimulus, the representative polymer chains 708 extend out. The chains may extend in substantially the same direction or may extend in random directions. The extension of the chains creates a barrier inside the perforations 706. The extended chains block the pathway of the particles. In an exemplary embodiment, the stimulus induced process of converting from the coiled state to the extended state and back to the coiled state is reversible. This is represented by the double arrows in drawing 700. In another embodiment, this process may be irreversible to create a permanent image.

FIG. 8 is a portion of a reflective display comprising a perforated sheet with a stimuli-responsive coating. Display 800 is similar to display 500 in FIG. 5 except the coating is stimuli-responsive. Display 800 comprises an outward transparent front sheet 802, transparent front electrode 804, rear support 806, rear electrode layer 808, medium 810, electrophoretically mobile particles 812 and a continuous perforated sheet 814. Sheet 814 comprises perforations 816. Dotted lines 818 represent the continuous nature of sheet 814. Sheet 814 comprises a light reflective layer 820 on top and facing outward sheet 802. The perforated sheet 814 further includes a stimuli-responsive coating 822. Display 800 may further comprise a voltage source, at least one dielectric layer or spacer structure (not shown).

The display 800 in FIG. 8 is operated a follows. On the left side of the dotted line 824, the charged particles 812 are attracted to a voltage of opposite polarity at the rear electrode 808. A stimulus may then be applied to coating 822. The representative polymer chains of coating 822 respond to the stimulus by changing their shape. In the representative illustration in FIG. 8, the chains extend outward into an extended state. This blocks passage of particles 812 through perforations 816. The particles are held in the rear of the display behind sheet 814. The coating of polymer 822 acts as a barrier and restricts movement of the particles. Incident light, represented by light ray 826, may be reflected off of the reflective surface 820 of the perforated sheet. The reflected light ray 828 is reflected back toward the viewer 830 to create a light or bright state of the display.

A stimulus may then be applied to the polymer chains of coating 822. The stimulus coils the polymer chains as illustrated to the right of dotted line 824. This creates a pathway through perforations 816 to allow passage of the particles to the opposite electrode. When a bias of opposite polarity is applied at the front electrode 804, the electrophoretically mobile particles pass through the perforations 816. The charged particles 812 move to the front electrode 804 where a bias of opposite polarity of the charge on the particles is applied. The particles collect near the surface of the front electrode layer 804. The particles 812 absorb incident light that passes through the transparent front sheet 802. This is represented by light ray 832 being absorbed by particles 812. This results in a dark state of the display. The polymer chains of coating 822 may then be re-extended in response to an applied stimulus. This re-blocks the passage of particles through perforations 816 and imparts bistability into the display.

Figure 9:
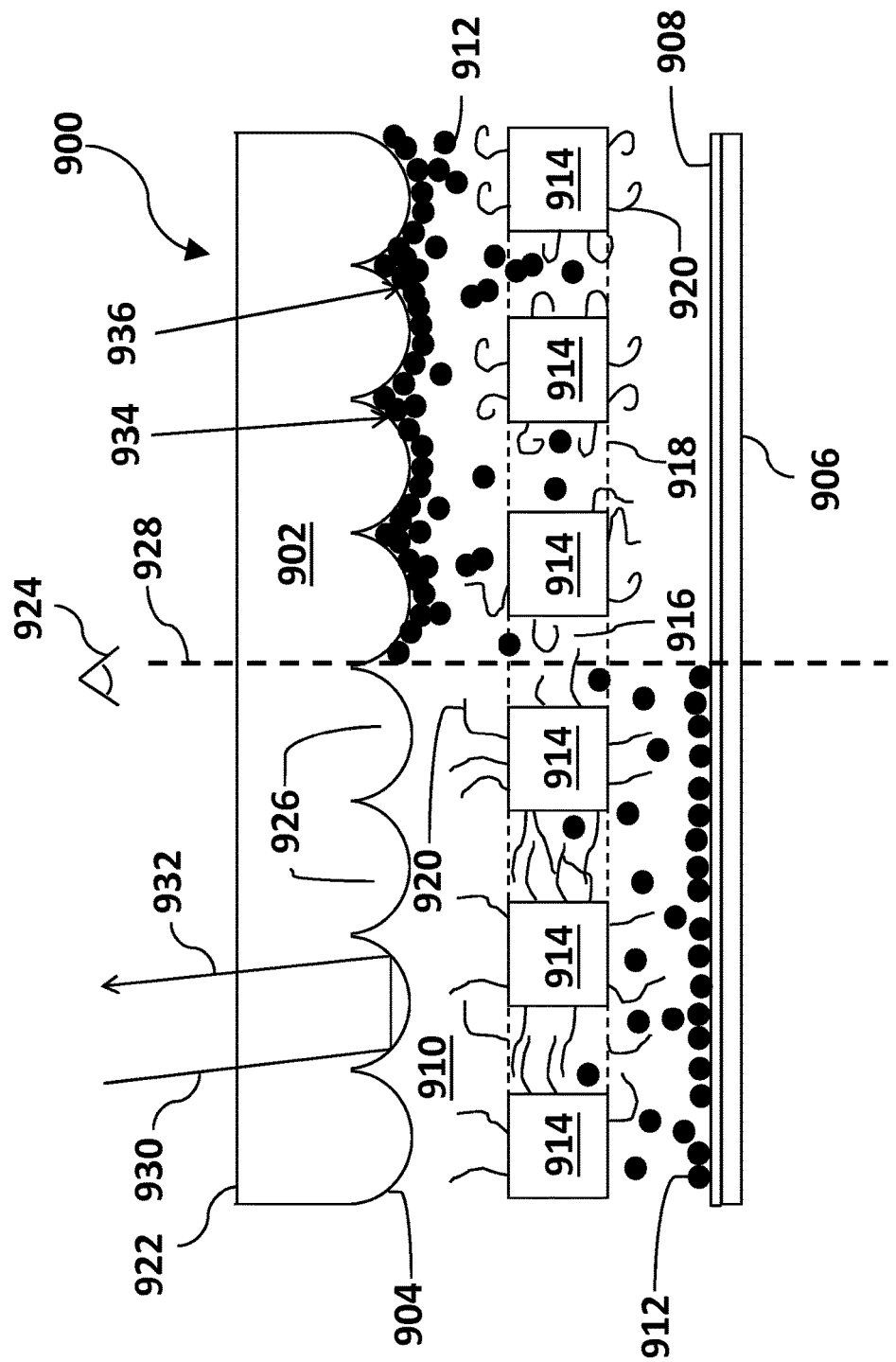
FIG. 9 is a portion of a TIR-based display comprising a perforated sheet with a stimuli-responsive coating.

FIG. 9 is a portion of a TIR-based display comprising a perforated sheet with a stimuli-responsive coating. Display 900 is similar to display 600 in FIG. 6 except the coating is stimuli-responsive. Display 900 comprises an outward transparent front sheet 902, transparent front electrode 904, rear support 906, rear electrode layer 908, medium 910, electrophoretically mobile particles 912 and a continuous perforated sheet 914 with perforations 916. Dotted lines 918 represent the continuous nature of sheet 914. The perforated sheet 914 further includes a coating 920. Outward transparent front sheet 902 comprises a flat outward surface 922 facing viewer 924 and a large plurality of transparent convex protrusions 926 at the inward surface. In some embodiments display 900 may further comprise a voltage source (not shown). In other embodiments display 900 may further comprise at least one spacer structure. In other embodiments display 900 may further comprise at least one dielectric layer.

Display 900 in FIG. 9 is operated as follows. On the left side of the dotted line 928, the charged particles 912 are attracted to a voltage of opposite polarity at the rear electrode 908. A stimulus may be applied to the coating 920 to extend the polymer chains and block passage of the particles through perforations 916. Coating 920 acts as a barrier to movement of the electrophoretically mobile particles 912. Incident light, represented by light ray 930, may be totally internally reflected at the surface of the hemispherical protrusions 926. The reflected light ray 932 is reflected back toward the viewer 924 to create a light or bright state of the display. In some embodiments, a light reflective layer may be added to the top surface of sheet 914 facing the inward hemispherical surface of sheet 902.

A stimulus may then be applied to the polymer chains of coating 920. The stimulus coils the polymer chains as illustrated to the right of dotted line 924. This creates a pathway through perforations 916 to allow passage of the particles to the opposite electrode. When a bias of opposite polarity is applied at the front electrode 904 above the threshold voltage, the electrophoretically mobile particles pass through the perforations 916. The charged particles 912 are attracted to the front electrode 904 where a bias of opposite polarity is applied. The particles collect near the surface of the front electrode layer 904 and enter the evanescent wave region. The particles 912 frustrate TIR and absorb incident light rays that pass through the transparent front sheet 902. This is represented by light rays 934 and 936 being absorbed by particles 912. This results in a dark state of the display. A stimulus may then be applied to re-extend the polymer chains and block passage of particles 912 through perforations 916.

In some embodiments, a second current or voltage source may be used to apply a stimulus to the coating.

In another embodiment, the dimensions of the perforations are appropriately sized with respect to the size of the electrophoretically mobile particles to provide a threshold. The electrophoretically mobile particles comprise an electric double layer on the surface. This further provides a resistive force when in close proximity to the walls of the perforations. This prevents migration of the particles through the appropriately sized perforations. When a voltage is applied below a threshold value, the resistive force between the electric double layer on the particles and the walls of the perforations prevents migration of the particles through the perforations. When a voltage is applied above a threshold value, the resistive force formed between the electric double layer on the particles and the walls of the perforations is overcome. The particles are then allowed to migrate through the perforations of the perforated sheet.

In other embodiments, any of the reflective image displays with a perforated sheet described herein may further include at least one edge seal. An edge seal may be a thermally or photo-chemically cured material. The edge seal may contain an epoxy, silicone or other polymer based material.

In other embodiments, any of the reflective image displays with a perforated sheet described herein may further include at least one cross-wall (may also be referred to as side-walls). Cross-walls limit particle drift and diffusion to improve display performance and bistability. Cross-walls may completely or partially extend from the front electrode, rear electrode or both the front and rear electrodes. Cross-walls may comprise plastic or glass.

In some embodiments a directional front light or a color filter array layer may be employed with the reflective display designs with perforated sheet described herein. In other embodiments both a front light and a color filter may be employed with the display designs described herein. In other embodiments a light diffusive layer may be used with the display to "soften" the reflected light observed by the viewer. In other embodiments a light diffusive layer may be used in combination with a front light or a color filter layer or a combination thereof.

In some embodiments, a tangible machine-readable non-transitory storage medium that contains instructions may be used in combination with the reflective displays with perforated sheet described herein. In other embodiments the tangible machine-readable non-transitory storage medium may be further used in combination with one or more processors.

In the display embodiments described herein, they may be used in applications such as electronic book readers, portable computers, tablet computers, wearables, cellular telephones, smart cards, signs, watches, shelf labels, flash drives and outdoor billboards or outdoor signs.

The following examples are provided to further illustrate non-exclusive embodiments of the disclosure. Example 1 relates to a reflective image display, comprising: a front electrode; a rear electrode, the front and the rear electrode forming a gap therebetween; a transparent medium disposed in the gap; a plurality of mobile electrophoretic particles dispersed in the transparent medium and movable within the gap; and a barrier interposed between the front electrode and the rear electrode, the barrier configured to permit movement of at least one electrophoretic particle from the front electrode to the rear electrode.

Example 2 is directed to the image display of example 1, further comprising a voltage source to bias one or more of the front electrode or the rear electrode.

Example 3 is directed to the image display of any of the preceding examples, wherein the barrier defines a perforated barrier and wherein the barrier permits movement of the at least one electrophoretic particle when biased by the biasing source.

Example 4 is directed to the image display of any of the preceding examples, wherein the barrier further comprises at least one aperture.

Example 5 is directed to the image display of any of the preceding examples, wherein the at least one aperture further comprises a polymer with extendable chains.

Example 6 is directed to the image display of any of the preceding examples, wherein the extendable chains extend or contract in response to an external stimulus.

Example 7 is directed to the image display of any of the preceding examples, wherein the extendable chains extend or contract in response to an electromagnetic force.

Example 8 is directed to the image display of any of the preceding examples, wherein a method for displaying a reflective image comprises: positioning at least one charged electrophoretic particle in a transparent medium disposed between a front electrode and a rear electrode, biasing the front electrode relative to the rear electrode with a first voltage to form an electromagnetic field therebetween thereby attracting the at least one charged electrophoretic particle to one of the front electrode or the rear electrode, and stimulating a barrier layer relative to one or more of the first or the second electrode to expedite movement of the at least one electrophoretic particle from the front electrode to the rear electrode.

Example 9 is directed to the image display of any of the preceding examples, wherein the barrier layer further comprises a perforation permitting movement of the at least one electrophoretic particle therethrough.

Example 10 is directed to the image display of any of the preceding examples, wherein the perforation is coated with a polymer having extendable chains.

Example 11 is directed to the image display of any of the preceding examples, further comprising activating the extendable chains by biasing the barrier layer with a second voltage.

Example 12 is directed to the image display of any of the preceding examples, wherein the extendable chains extend or contract when the barrier layer s biased relative to one or more of the front or the rear electrodes.

Example 13 is directed to the image display of any of the preceding examples, wherein the extendable chains extend or contract in response to an electromagnetic force.

Example 14 is directed to the image display of any of the preceding examples, further comprising a non-transitory computer-readable storage device having a set of instructions to cause a processor to perform a process comprising: affecting movement of at least one charged electrophoretic particle in a transparent medium disposed between a front electrode and a rear electrode, biasing the front electrode relative to the rear electrode with a first voltage to form an electromagnetic field therebetween thereby attracting the at least one charged electrophoretic particle to one of the front electrode or the rear electrode, and stimulating a barrier layer relative to one or more of the first or the second electrode to expedite movement of the at least one electrophoretic particle from the front electrode to the rear electrode.

Example 15 is directed to the image display of any of the preceding examples, further comprising a non-transitory computer readable storage device, wherein the barrier layer further comprises a perforation permitting movement of the at least one electrophoretic particle therethrough.

Example 16 is directed to the image display of any of the preceding examples, further comprising a non-transitory computer readable storage device wherein, the perforation is coated a polymer having extendable chains.

Example 17 is directed to the image display of any of the preceding examples, further comprising a non-transitory computer readable storage device, comprising activating the extendable chains by stimulating the barrier layer.

Example 18 is directed to the image display of any of the preceding examples, further comprising a non-transitory computer readable storage device, wherein the extendable chains extend or contract when the barrier layer is biased relative to one or more of the front or the rear electrodes.

Example 19 is directed to the image display of any of the preceding examples, further comprising a non-transitory computer readable storage device, wherein the extendable chains extend or contract in response to an electromagnetic force.

While the principles of the disclosure have been illustrated in relation to the exemplary embodiments shown herein, the principles of the disclosure are not limited thereto and include any modification, variation or permutation thereof.

What is claimed is:

1. A reflective image display, comprising:
    a front electrode:
    a rear electrode, the front and the rear electrode forming a gap therebetween;
    a transparent medium disposed in the gap;
    a plurality of mobile electrophoretic particles dispersed in the transparent medium and movable within the gap; and
    a barrier comprising a stimuli-responsive coating interposed between the front electrode and the rear electrode, the coating configured to form a physical barrier to permit movement of at least one electrophoretic particle from the front electrode to the rear electrode.

2. The image display of claim 1, further comprising a voltage source to bias one or more of the front electrode or the rear electrode.

3. The image display of claim 2, wherein the barrier defines a perforated barrier and wherein the barrier permits movement of the at least one electrophoretic particle when biased by the biasing source.

4. The image display of claim 1, wherein the barrier further comprises at least one aperture.

5. The image display of claim 4, wherein the coating comprises a polymer with extendable chains.

6. The image display of claim 5, wherein the extendable chains extend or contract in response to an external stimulus.

7. The image display of claim 5, wherein the extendable chains extend or contract in response to an electromagnetic force.

8. A method for displaying a reflective image, the method comprising:
    positioning at least one charged electrophoretic particle in a transparent medium disposed between a front electrode and a rear electrode:

biasing the front electrode relative to the rear electrode with a first voltage to form an electromagnetic field therebetween thereby attracting the at least one charged electrophoretic particle to one of the front electrode or the rear electrode; and stimulating a stimuli-response coating on a barrier layer relative to one or more of the first or the second electrode to provide a threshold to movement of the at least one electrophoretic particle from the front electrode to the rear electrode.

9. The method of claim 8, wherein the barrier layer further comprises a perforation permitting movement of the at least one electrophoretic particle therethrough.

10. The method of claim 9, wherein the perforation is coated with a polymer having extendable chains.

11. The method of claim 10, further comprising activating the extendable chains by biasing the barrier layer with a second voltage.

12. The method of claim 10, wherein the extendable chains extend or contract when the barrier layer is biased relative to one or more of the front or the rear electrodes.

13. The method of claim 10, wherein the extendable chains extend or contract in response to an electromagnetic force.

14. A non-transitory computer-readable storage device having a set of instructions to cause a processor to perform a process comprising:

affecting movement of at least one charged electrophoretic particle in a transparent medium disposed between a front electrode and a rear electrode:

biasing the front electrode relative to the rear electrode with a first voltage to form an electromagnetic field therebetween thereby attracting the at least one charged electrophoretic particle to one of the front electrode or the rear electrode; and stimulating a stimuli-responsive coating on a barrier layer relative to one or more of the first or the second electrode to provide a threshold to movement of the at least one electrophoretic particle from the front electrode to the rear electrode.

15. The non-transitory computer readable storage device of claim 14, wherein the barrier layer further comprises a perforation permitting movement of the at least one electrophoretic particle therethrough.

16. The non-transitory computer readable storage device of claim 15, wherein the perforation is coated with a polymer having extendable chains.

17. The non-transitory computer readable storage device of claim 16, further comprising activating the extendable chains by stimulating the barrier layer.

18. The non-transitory computer readable storage device of claim 16, wherein the extendable chains extend or contract when the barrier layer is biased relative to one or more of the front or the rear electrodes.

19. The non-transitory computer readable storage device of claim 16, wherein the extendable chains extend or contract in response to an electromagnetic force.

20. A reflective image display, comprising:
a front electrode:
a rear electrode, the front and the rear electrode forming a gap therebetween;
a transparent medium disposed in the gap;
a plurality of mobile electrophoretic particles dispersed in the transparent medium and movable within the gap; and
a barrier opening interposed between the front electrode and the rear electrode, the barrier opening configured to permit movement of at least one electrophoretic particle from the front electrode to the rear electrode, the barrier opening coated with a polymer having extendible chains.

21. The reflective image display of claim 20, wherein the polymer extends in response to one or more stimuli.

22. The reflective image display of claim 20, wherein the polymer extends in response to an electromagnetic force.

23. A method for displaying a reflective image, the method comprising:

positioning at least one charged electrophoretic particle in a transparent medium disposed between a front electrode and a rear electrode:

biasing the front electrode relative to the rear electrode with a first voltage to form an electromagnetic field therebetween thereby attracting the at least one charged electrophoretic particle to one of the front electrode or the rear electrode; and stimulating a plurality of polymers coated on a barrier layer interposed between the front and the rear electrodes to substantially affect movement of the at least one electrophoretic particle between the front and the rear electrodes.

24. The method of claim 23, further comprising stimulating the plurality of polymers to thereby extend one or more polymer chains to substantially obstruct movement of the at least one electrophoretic particle.

25. The method of claim 23, further comprising stimulating the plurality of polymers to thereby contract one or more polymer chains to permit movement of the at least one electrophoretic particle.

* * * * *